US006899371B1

(12) United States Patent
Hammond

(10) Patent No.: US 6,899,371 B1
(45) Date of Patent: May 31, 2005

(54) AUXILIARY SUN VISOR

(76) Inventor: Dorothy L. Hammond, P.O. Box 21295, Wichita, KS (US) 67208

( * ) Notice: Subject to any disclaimer, the term of this patent is extended or adjusted under 35 U.S.C. 154(b) by 0 days.

(21) Appl. No.: 10/717,688

(22) Filed: Nov. 20, 2003

(51) Int. Cl.[7] .............................................. B60J 3/02
(52) U.S. Cl. ................... 296/97.6; 296/97.11
(58) Field of Search ............................ 296/97.6, 97.9, 296/97.1, 97.11

(56) References Cited

U.S. PATENT DOCUMENTS

| | | | |
|---|---|---|---|
| 3,617,088 A | 11/1971 | Graham | |
| 4,090,732 A | 5/1978 | Vistitsky | |
| 4,195,876 A | 4/1980 | Timperio | |
| 4,580,829 A | 4/1986 | Matheopoulos | |
| 4,982,992 A | 1/1991 | Vu et al. | |
| 5,165,748 A | 11/1992 | O'Connor | |
| 5,445,427 A | 8/1995 | Vandagriff | |
| 5,484,183 A * | 1/1996 | Rosa | 296/97.6 |
| 5,673,957 A * | 10/1997 | Moo et al. | 296/97.6 |
| 6,059,347 A | 5/2000 | Davalos | |
| 6,224,137 B1 * | 5/2001 | Hunker | 296/97.6 |
| 6,309,004 B1 * | 10/2001 | McNutt et al. | 296/97.6 |
| 6,409,246 B1 * | 6/2002 | Rennie | 296/97.6 |
| 6,412,850 B1 | 7/2002 | Francis et al. | |

* cited by examiner

*Primary Examiner*—Stephen Gordon
(74) *Attorney, Agent, or Firm*—Dale J. Ream

(57) ABSTRACT

An auxiliary sun visor for a vehicle sun visor comprises an auxiliary sun visor panel, a pair of opposed clips, a track assembly defining a first axis attached to the clips, and a mount for attaching the visor panel to the track assembly and for permitting pivotal movement of the panel about the first axis and a second axis transverse to the first axis. The clips are configured for coupling the auxiliary visor to a vehicle sun visor. The track assembly and mount cooperably permit the pivotal movement of the panel about the first axis. The mount may be selectively positioned along the track assembly in order to move the position of the second axis relative to the first axis.

14 Claims, 9 Drawing Sheets

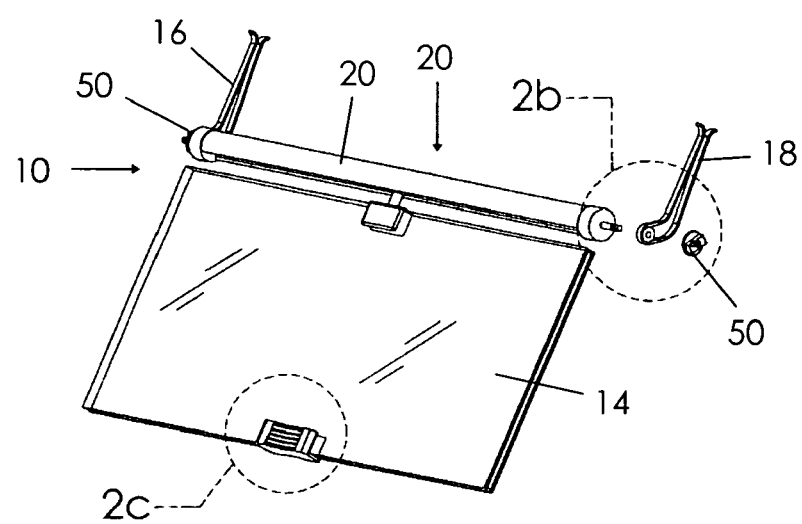
Fig. 2a
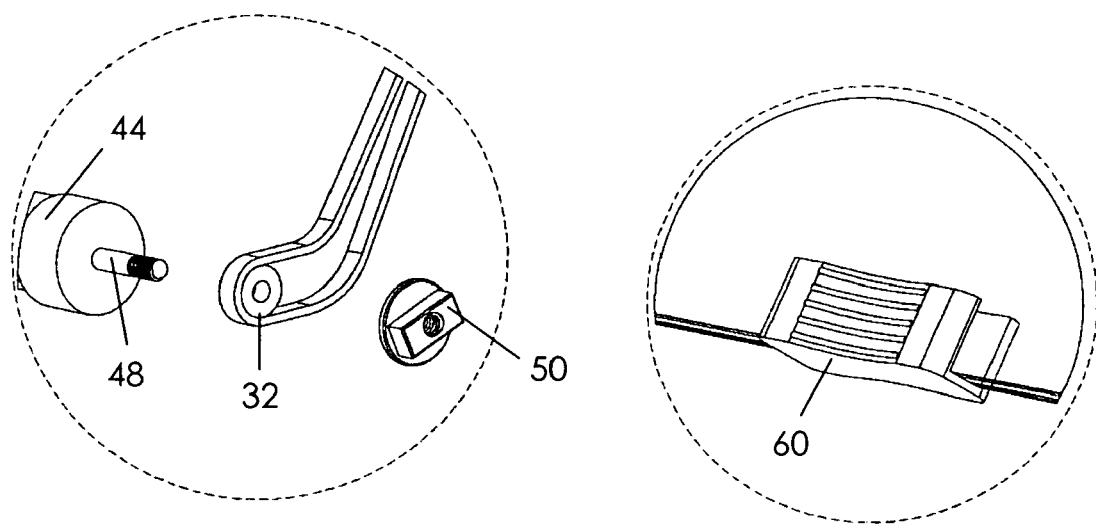
Fig. 2b
Fig. 2c

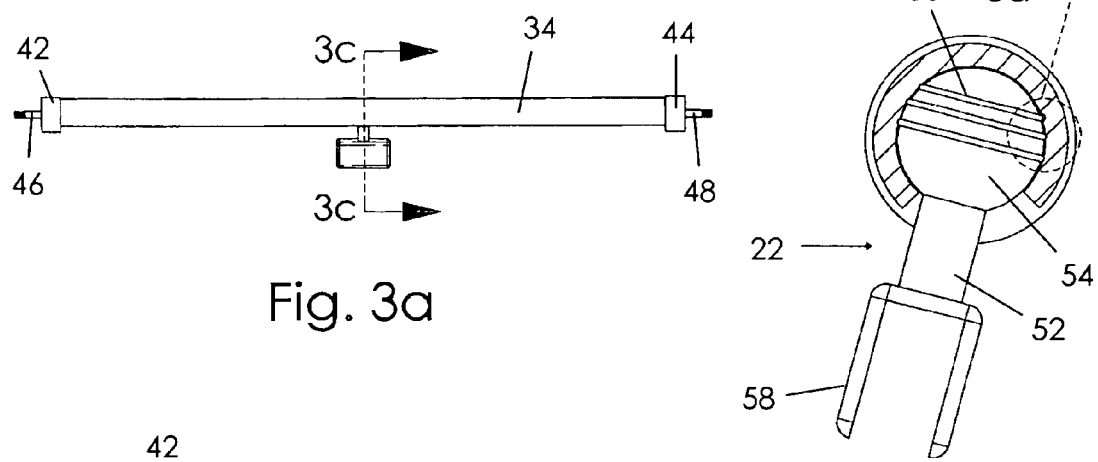
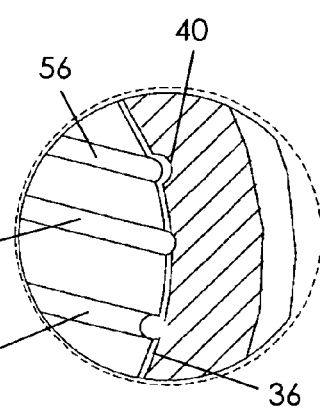
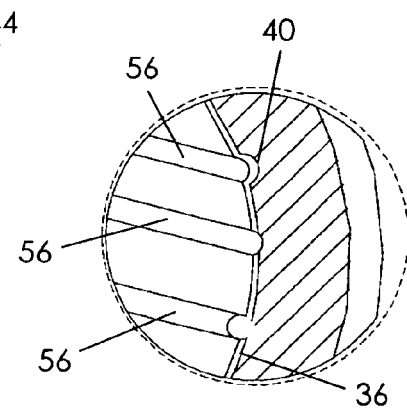

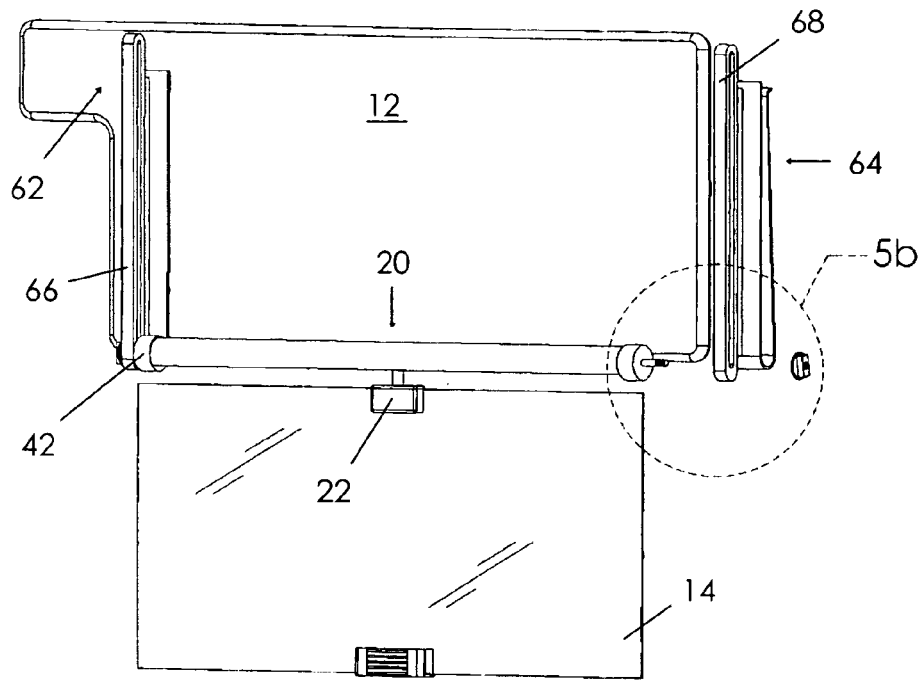
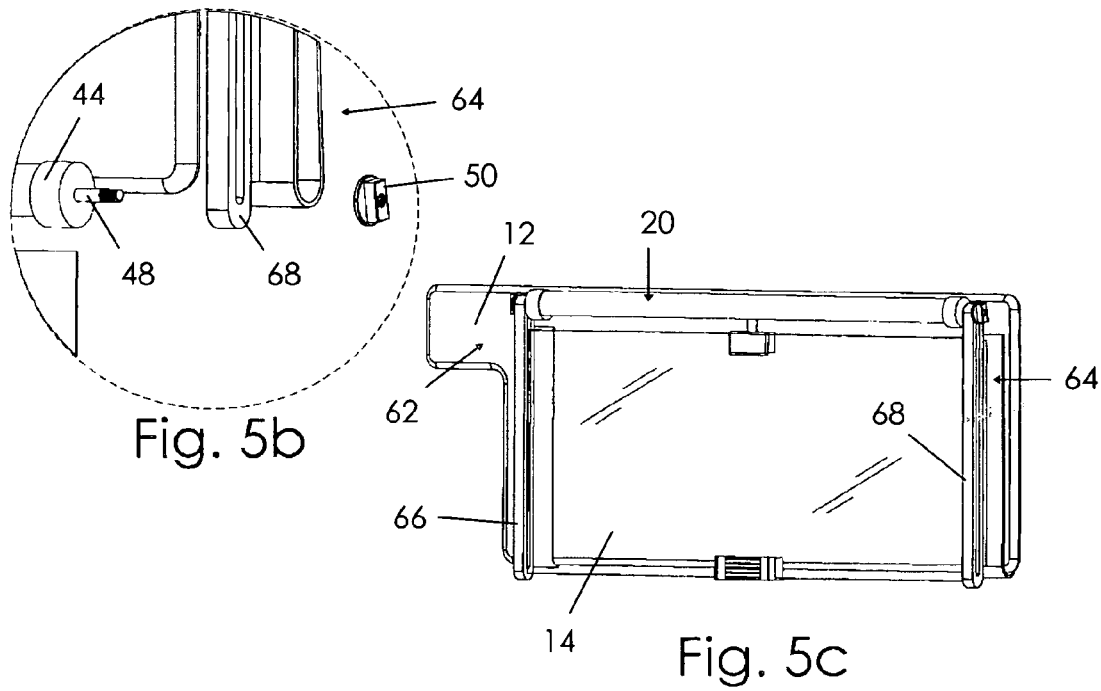

AUXILIARY SUN VISOR

BACKGROUND OF THE INVENTION

1. Field of the Invention

The present invention relates generally to an auxiliary sun visor that may be attached to a vehicle sun visor for increasing the utility of the standard sun visor in preventing unwanted glare and heat while driving a vehicle facing the sun, or other light source. More particularly, the present invention yields an auxiliary visor having increased positioning capabilities as compared to prior art devices.

2. Discussion of the Prior Art

Prior art devices are known that provide an auxiliary sun visor that may be attached to a standard sun visor mounted in a vehicle for increasing the utility of the standard visor in blocking the glare and heat caused by driving while facing the sun, or other light source. For example, U.S. Pat. No. 6,059,347 to Davalos discloses a visor attachment that may be attached to a standard vehicle sun visor and provides increased shading beneath, and to either side of the standard visor. This increased shading capability is provided by three different visor extensions slidably mounted within a casing. While the visor attachment disclosed in the Davalos patent addresses the need for increasing the shading capability of a standard visor, the attachment is relatively complex and bulky in that it requires three different panels to yield an increased shading perimeter around the standard visor.

U.S. Pat. No. 6,412,850 to Francis et al. discloses an auxiliary sun visor assembly capable of providing increased shading beneath a visor and alternatively to one side of the visor using a relatively simple design requiring only one auxiliary panel. The assembly disclosed in the Francis patent, however, offers only three basic positions for the auxiliary shading panel when deployed. In addition, when deployed beneath the standard visor, the hinge brackets disclosed generate a relatively large and potentially dangerous blind-spot in the line of sight of a driver.

BRIEF SUMMARY OF THE INVENTION

An auxiliary sun visor for a standard vehicle sun visor broadly comprises an auxiliary sun visor panel, a pair of opposed visor clips, a track assembly attached to the clips and a mount for attaching the panel to the track assembly. The track assembly permits pivotal movement of the panel about a first axis for selective storage and deployment of the visor panel. The mount is coupled with the track assembly and may be rotated about a second axis for selective angling of the panel with respect to the standard visor. In addition, the mount may be adjusted along the track assembly in order to selectively adjust the position of the second axis with respect to the first axis.

In a preferred embodiment, the track assembly includes a hollow body having a generally C-shaped cross section, and an interior wall defining an interior channel. A pair of posts extend from each end of the track assembly body for attaching the body to the visor clips. The mount includes a first portion having a ball and a second portion having a panel clip. The ball is sized to be fitted in the channel of the track assembly body permitting pivotal movement of the panel about the second axis and, to a limited degree, about the first axis as well. The panel clip is sized for friction fitting with the visor panel.

An alternative visor clip includes a slide for coupling with each end of the track assembly. As a result, the track assembly and, therefore, the position of the first axis, may be adjusted. Storage of the panel attached to a visor with the alternative clips is accomplished by sliding the track assembly until the panel overlaps the visor. Deployment is accomplished by pulling the panel to a desired extended position relative to the visor.

In an alternative embodiment, the track assembly includes an elongated solid body and the mount includes a channel defined therethrough for receiving the body. A spring-biased push button operates as a releasable brake for selective positioning of the mount along the track assembly body while permitting pivotal movement of the panel about the first axis. The alternative mount includes a ball and socket joint permitting pivotal movement of the panel about the second axis.

In another alternative embodiment, the visor includes a pair of shell halves joined to form the visor and present an interior space having a distal opening. A pair of opposed track assembly guides are disposed within the casing and are coupled with the track assembly so that the panel may be selectively stowed within the casing or deployed to a selected position outside the casing. The mount and track assembly cooperably permit pivotal movement of the panel about the first and second axes and selective adjustment of the second axis relative to the first axis while the panel is in a substantially deployed position.

As a result, the present invention addresses the prior art need of providing an auxiliary visor enabling selective shading of the areas surrounding a standard visor. The present invention, therefore, increases the utility of the standard visor through the use of a single auxiliary panel.

BRIEF DESCRIPTION OF THE SEVERAL VIEWS OF THE DRAWINGS

Preferred embodiments of an auxiliary sun visor are described in detail below with reference to the drawing figures, wherein:

FIG. 2a is a perspective view of the auxiliary visor of FIG. 1a;

FIG. 2b is a fragmentary, perspective view of an end of the track assembly and a visor clip;

FIG. 2c is a fragmentary, perspective view of a panel grip of the present invention;

FIG. 3a is a front elevation of the track assembly and mount;

FIG. 3b is a perspective view of the track assembly and mount;

FIG. 3c is a cross-sectional view of the track assembly and mount taken along line 3c of FIG. 3a.

FIG. 3d is a fragmentary, cross-sectional view of the track assembly and mount;

FIG. 5a is a perspective view of an auxiliary visor having alternative visor clips;

FIG. 5b is a fragmentary view of an end of the track assembly and one of the alternative clips;

FIG. 5c is a perspective view of the auxiliary visor of FIG. 5a showing the panel in a stowed position;

FIG. 9b is a cross-sectional view of the auxiliary visor taken along line 9b of FIG. 9a.

DETAILED DESCRIPTION OF THE PREFERRED EMBODIMENTS

Figure 1A:
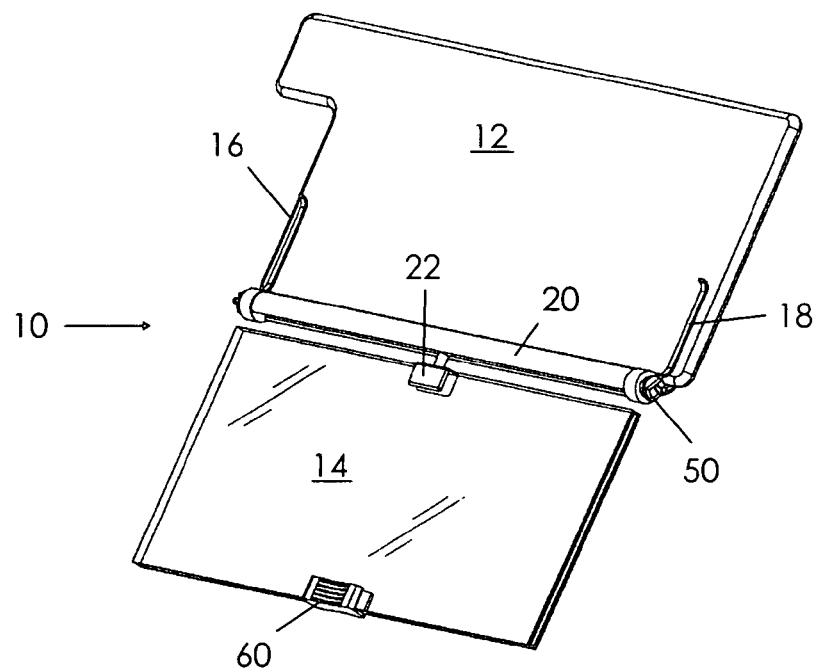
FIG. 1a is a perspective view of the auxiliary visor constructed in accordance with a preferred embodiment of the present invention showing the panel in a deployed position.

Referring now to the drawings, FIG. 1a depicts an auxiliary sun visor 10 constructed in accordance with a preferred embodiment of the present invention. The auxiliary visor 10 is shown attached to a standard vehicle visor 12. The auxiliary visor 10 broadly comprises an auxiliary sun visor panel 14, a pair of opposed clips 16, 18, a track assembly 20 and a mount 22 for attaching the panel 14 to the track assembly 20.

Figure 4:
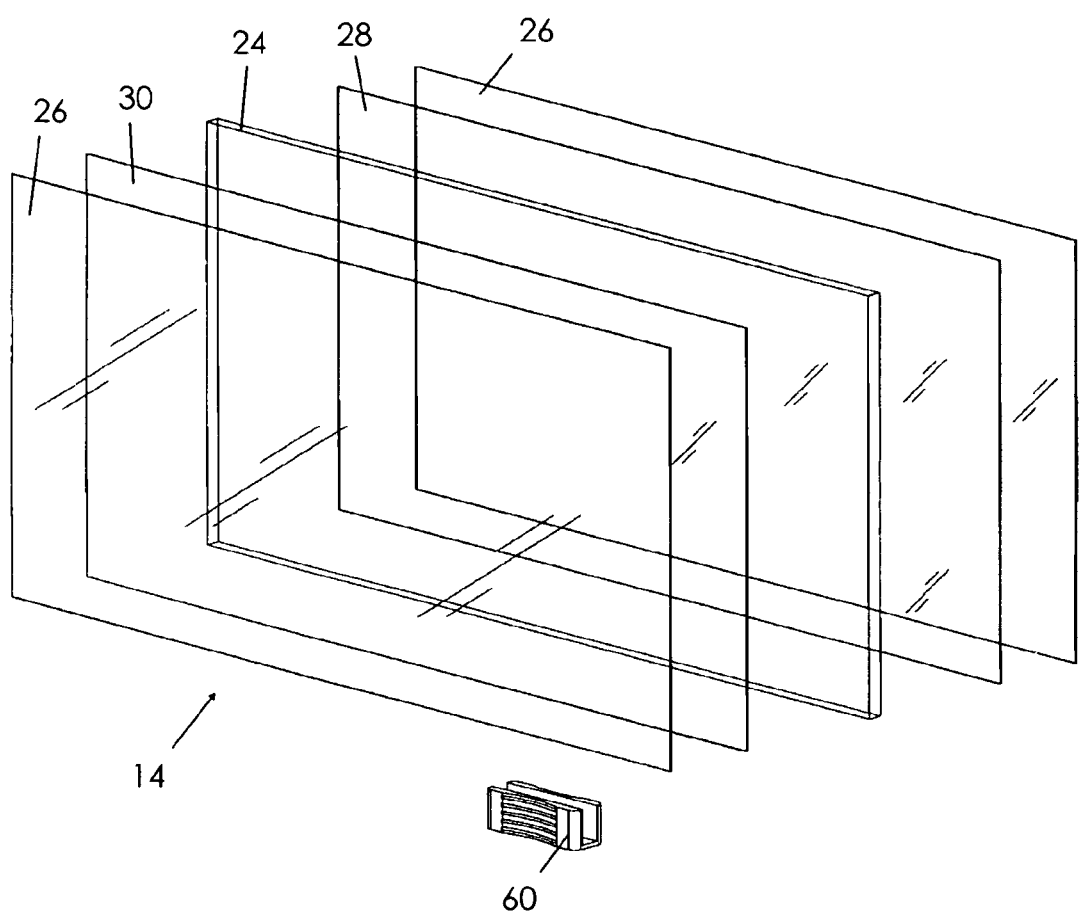
FIG. 4 is an exploded, perspective view of the panel.

As shown in FIG. 4, the panel 14 is preferably shaded to reduce glare from light sources, such as headlights from cars or the sun and reflections of sunlight, while maintaining sufficient transparency to enable a person to see through the panel while driving. The panel 14 includes several layers of materials including a generally transparent core 24, and outer layers of a suitable scratch-resistant film 26. An anti-reflective layer 28 is positioned between the core 24 and one of the films 26 and a shading layer 30 is positioned between the core 24 and the other film 26.

The core 24 is preferably constructed from a generally transparent synthetic resin material, such as a polycarbonate or acrylic material. The shading of the panel 14 may be accomplished by adding a tint to the core material while forming the core 24. When the core 24 is clear, as in the preferred embodiment, shading is accomplished by mating the shading layer 30 to the core 24. The shading layer 30 may be a tinted film, a photochromatic material that darkens when exposed to sunlight or a polarized filter oriented so that it tends to filter horizontally polarized light, such as reflections from horizontal surfaces like water and roadways.

The clips 16, 18 are constructed from material having memory, such as metal or plastic material, and are shaped to enable a user to slide the clips 16, 18 over a visor 12 and subsequently hold the position of the auxiliary visor 10 with respect to the vehicle visor 12. As shown in FIG. 2b, the clips 16, 18 include a bushing 32 affixed to a proximal end of each of the clips 16, 18. Each bushing 32 presents a hole therethrough.

Referring now to FIGS. 3a–d, the track assembly 20 includes a semi-cylindrical body 34 having a generally C-shaped cross section, and an interior wall 36 defining an interior channel 38. A groove 40 is formed in the interior wall 36 and spans between the ends of the body 34. A pair of caps 42, 44 are fitted to each end of the body 34. The caps 42, 44 include threaded posts 46, 48 extending therefrom. The body 34 is coupled with the clips 16, 18 by inserting the posts 46, 48 through the respective bushings 32 and securing a nut 50 to each of the posts 46, 48, as shown in FIG. 2a. The posts 46, 48 are co-located with and permit the body 34 to be rotated about a first axis.

As shown in FIGS. 3a–d, the mount 22 includes a first portion having a neck 52 and a ball 54 sized for being received in the channel 38 of the body 34. The ball 54 includes a plurality of ridges 56 disposed circumferentially about the ball 54. Each ridge 56 is sized to be received in the groove 40. The mount 22 further includes a second portion presenting a panel clip 58 for securing the panel 14 to the mount 22. The panel clip 58 may be coupled with the panel 14 by a friction fit, an adhesive material or other suitable means.

The ball 54 and channel 38 of the body 34 cooperably create a ball-and-socket joint permitting pivotal movement of the mount 22 about a second axis, transverse to the first axis. In addition, the ball 54 and channel 38 permit selective adjustment of the second axis with respect to the first axis by permitting the ball 54, and thus the mount 22 and panel 14, to be selectively slid back and forth along the track assembly body 34.

The ridges 56 assist in holding the panel 14 in a fixed radial position with respect to the body 34 while permitting movement of the panel 14 about the second axis and permitting selective adjustment of the second axis along the first axis. For example, when one of the ridges 56 is permitted to snap into the groove 40, the groove 40 guides the mount 22 as it is rotated about the second axis while maintaining the relative radial position of the mount 22, and thus the panel 14, during rotation. In addition, the groove 40 guides the mount 22 as the mount 22 is moved in the channel 38 maintaining the relative radial position of the mount 22 during selective adjustment of the second axis with respect to the first axis.

A grip 60 is positioned on a distal end of the panel 14, as shown in FIG. 4). The grip 60 facilitates adjustment of the panel 14 by providing a means for easily grasping the panel 14.

Figure 1B:
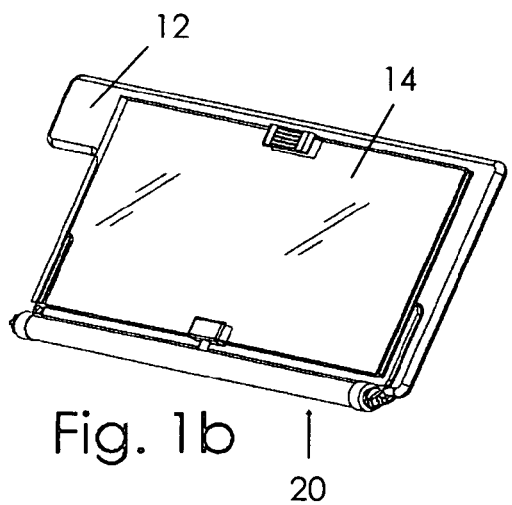
FIG. 1b is a perspective view of the auxiliary visor of FIG. 1a showing the panel in a stowed position.
Figure 1C:
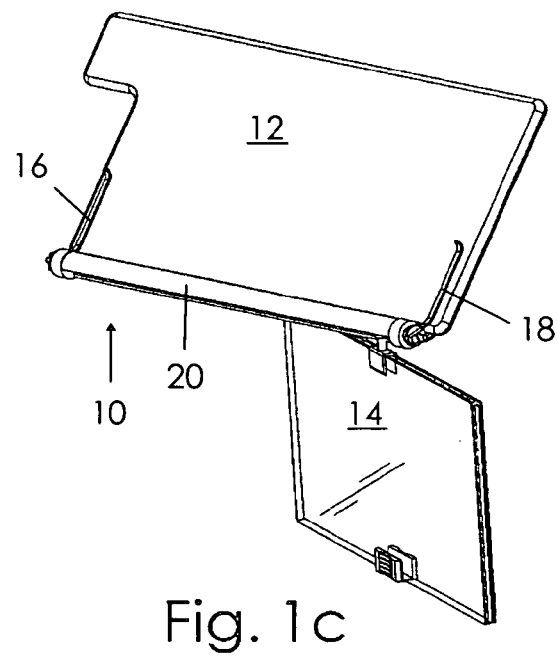
FIG. 1c is a perspective view of the auxiliary visor of FIG. 1a showing the panel in another deployed position.

In use, the auxiliary visor 10 is attached to a conventional vehicle visor 12 for increasing the effectiveness of the visor 12 in reducing glare caused by sunlight or artificial light sources, such as vehicle headlights. The auxiliary visor 10 is first clipped to the vehicle visor 12. Once the visor 12 is rotated into a use position, the panel 14 is rotated about the first axis from a stowed position, shown in FIG. 1b, into a deployed position, shown in FIG. 1a. The panel 14 may then be rotated about the second axis into a desired angle and moved along the track assembly body 34 to a desired position in order to maximize effectiveness of glare prevention, shown in FIG. 1c. It will be appreciated that the auxiliary visor 10 of the present invention provides the ability to selectively add shading around a vehicle visor 12 to a desired location beneath or beside the visor 12 through the use of a single panel 14.

When the shading offered by the auxiliary visor 10 is no longer needed, the panel 14 is rotated about the second axis until the panel 14 is generally coplanar with the first axis, the mount 22 is adjusted to a central position on the track assembly body 34, and the panel 14 is rotated about the first axis into the stowed position. Once the panel 14 is stowed, the vehicle visor 12 may then be rotated into its stowed position against the vehicle ceiling.

Turning now to FIGS. 5a–c, alternative clips 62, 64 are shown. The clips 62, 64 include slide elements 66, 68 adapted to receive posts 46, 48, and permit the posts 46, 48 to move up and down the slide elements 66, 68. As a result, the slide elements 66, 68 permit the track assembly body 34 to be moved thereby permitting adjustment of the first axis relative to the second axis.

In use, the slide elements 66, 68 enable the panel 14 to be moved between the stowed position and the deployed position without rotation of panel 14 about the first axis. The slide elements 66, 68 also permit selective positioning of the panel 14 so that a desired amount of the panel 14 extends from the vehicle visor 12. The advantage of this configuration is that the panel 14 is not required to be fully extended in order to provide appropriate or desired auxiliary shading.

Figure 6A:
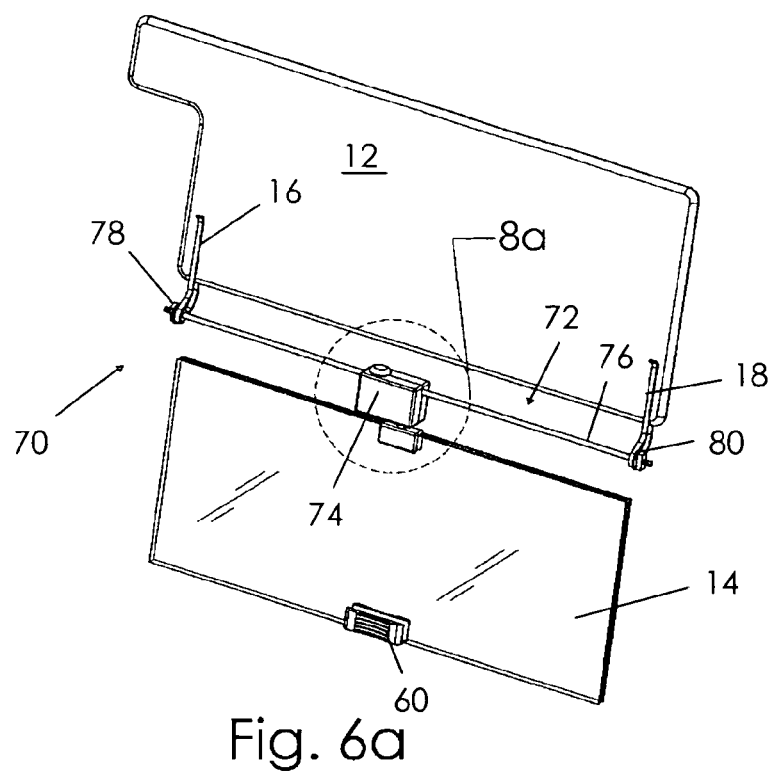
FIG. 6a is a perspective view of an auxiliary visor having a track assembly and mount constructed in accordance with an alternative embodiment.
Figure 6B:
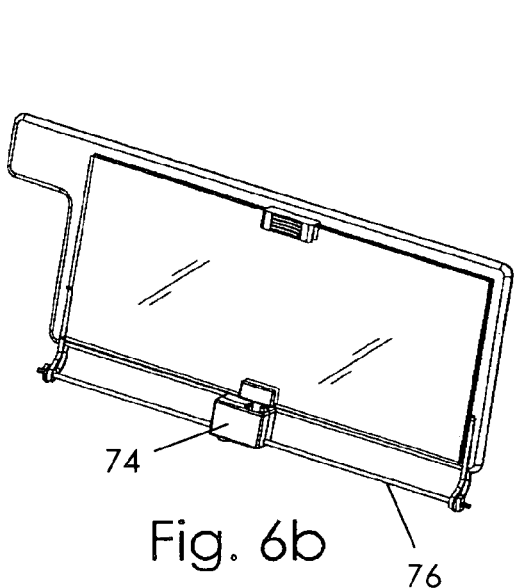
FIG. 6b is a perspective view of the auxiliary visor of FIG. 6a showing the panel in a stowed position.
Figure 6C:
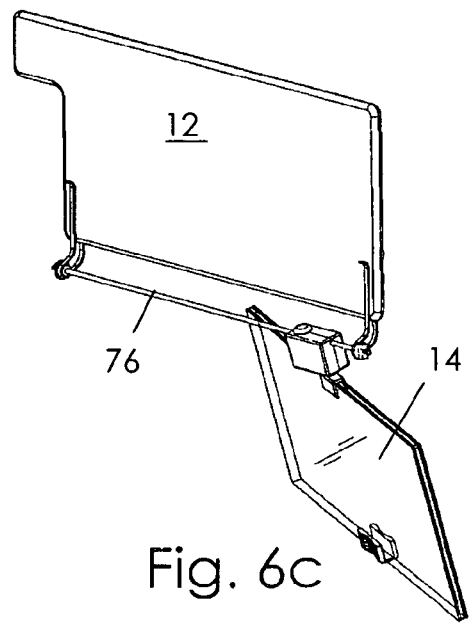
FIG. 6c is a perspective view of the auxiliary visor of FIG. 6c showing the panel in a deployed position.

FIGS. 6a–c depict an alternative embodiment 70 of the auxiliary visor. The alternative auxiliary visor 70 broadly comprises a track assembly 72 and a mount 74. The track assembly 72 includes an elongated solid body 76 having opposed, threaded ends. The ends of the body 76 are received through the respective bushings 32 of the clips 16, 18 and are secured to the clips 16, 18 by a pair of nuts 78, 80.

Figure 8A:
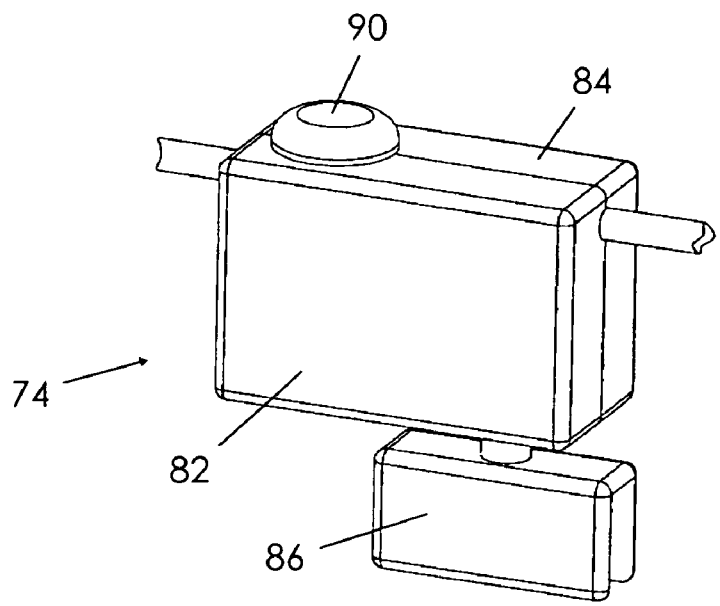
FIG. 8a is a perspective view of the alternative mount of FIGS. 6a–c.
Figure 8B:
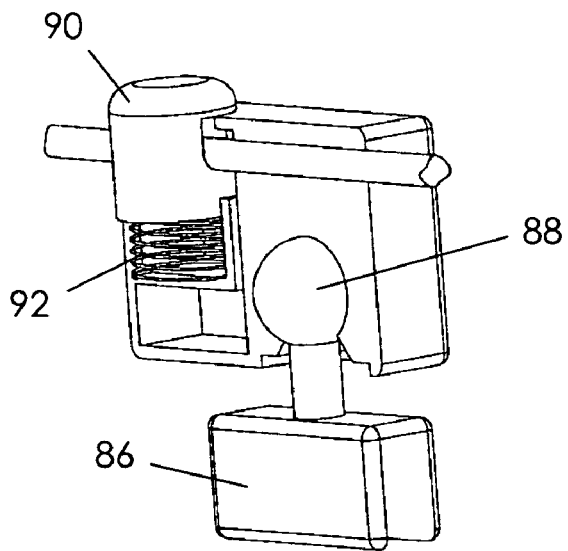
FIG. 8b is a perspective view in partial cutaway of the mount of FIG. 8a showing the release button in a brake position.
Figure 8C:
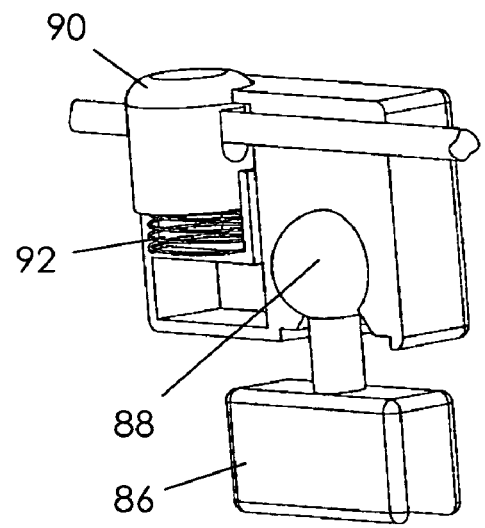
FIG. 8c is a perspective view in partial cutaway of the mount of FIG. 8a showing the release button in a depressed position.

As shown in FIGS. 8a–c, the mount 74 includes a pair of mount halves 82, 84 that when mated define a channel through the mount 74 and a socket. A panel clip 86 includes a ball 88 and is coupled with the mount 74 by placing the ball 88 in the socket. The resulting ball-and-socket joint permits rotation of the panel 14 about the second axis and a limited amount rotation about the first axis. A brake button 90 includes a semi-ovate aperture alined with the channel of the mount 74. A spring 92 biases the button 90 toward a braking position.

The mount 74 is coupled with the track assembly 72 via insertion of the body 76 through the mount channel. The button 90 affixes the mount 74, and thus the panel 14, to the track assembly body 76. Depressing the button 90, permits pivotal movement of the mount, and thus the panel 14, about the first axis. In addition, when the button 90 is depressed, the mount 74 may be moved along the track assembly body 76 thereby permitting selective adjustment of the second axis withe respect to the first axis.

Figure 7A:
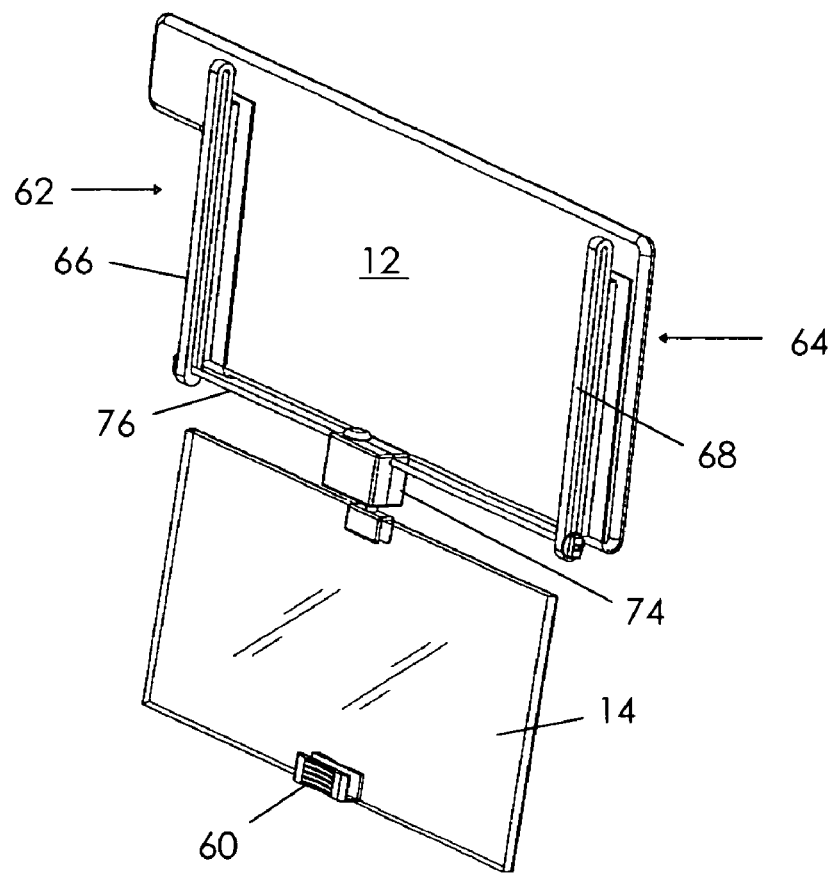
FIG. 7a is a perspective view of the track assembly and mount of FIG. 6a combined with the alternative clips of FIGS. 5a–c.
Figure 7B:
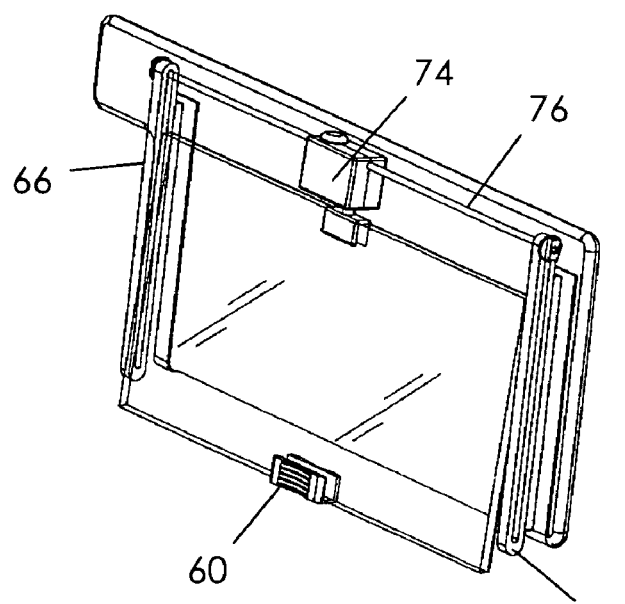
FIG. 7b is a perspective view of the auxiliary visor of FIG. 7a showing the panel in a stowed position.

In FIGS. 7a–b, the track assembly 72 and mount 74 are coupled with alternative clips 62, 68. The resulting visor assembly operates much the same as described above.

Figure 9A:
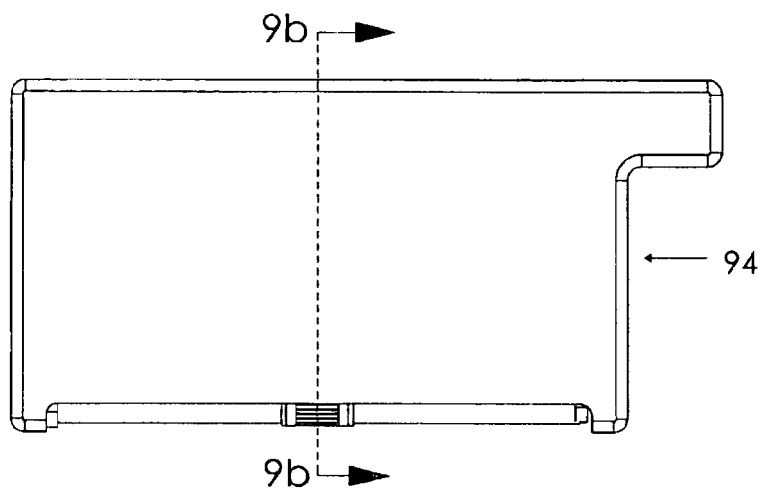
FIG. 9a is top view of another alternative auxiliary of the present invention with the panel in a stowed position.
Figure 9B:
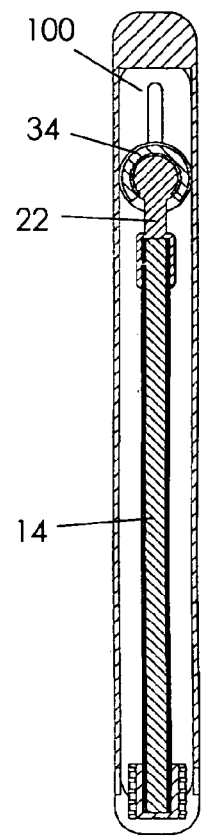
Figure 9C:
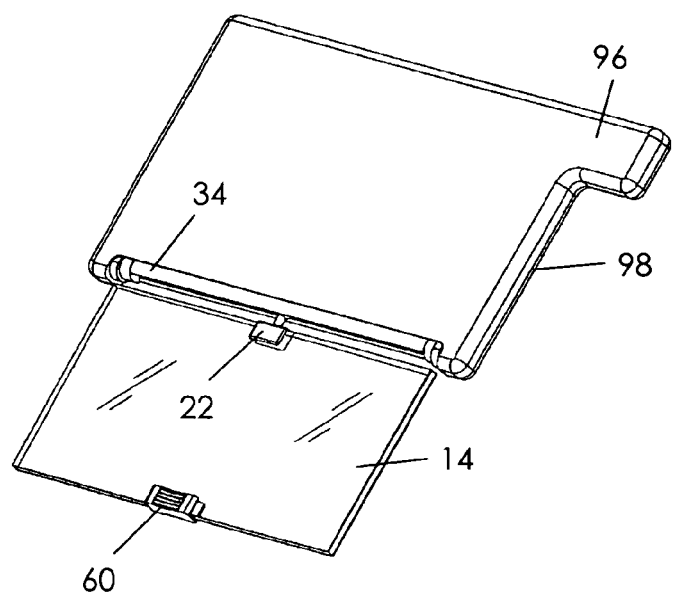
FIG. 9c is perspective view of the auxiliary visor of FIG. 9a showing the panel in a deployed position.

FIGS. 9a–c depict another alternative embodiment of the present invention. In this embodiment, a vehicle visor 94 is formed from a pair of clamshell visor halves 96, 98 having an interior space. A pair of opposed slides 100 are positioned within the vehicle visor 94 and are coupled with the track assembly 20 via posts 46, 48 and nuts 50 as discussed above.

The panel 14 is stowed within the visor 94. To be used, the panel 14 is pulled by the grip 60 until in a desired extended position. In a substantially extended position, as shown in FIG. 9c, the mount 22 and track assembly 20 operate in much the same fashion as described above, permitting selective pivotal movement of the panel 14 about a first axis and a second axis, and permitting adjustment of the second axis relative to the first axis.

The invention has been described in the above preferred embodiments with reference to the drawing figures. It is understood that substitutions may be made and equivalents employed herein without departing from the scope of the invention as set forth in the following claims.

What is claimed is:

1. An auxiliary sun visor for a vehicle sun visor comprising:
   an auxiliary sun visor panel;
   attachment means for attaching the visor panel to the vehicle sun visor, the attachment means including a pair of opposed clips;
   panel adjustment means for permitting pivotal movement of the visor panel about a first axis and a second axis, and for permitting selective adjustment of the second axis relative to the first axis, the adjustment means including a track assembly spanning between the clips and a panel mount coupled with the track assembly; and
   wherein the track assembly includes a hollow body having first and second ends and presenting a generally C-shaped cross-section, and an interior channel defined by an interior wall, and the mount includes a first portion having a ball received in the interior channel of the track assembly body permitting pivotal movement of the mount about the first and second axes, and a second portion coupled with the panel.

2. The auxiliary sun visor as set forth in claim 1, wherein the second axis is transverse to the first axis.

3. The auxiliary sun visor as set forth in claim 1, wherein the panel presents a pair of opposed side edges and the second axis is located between the edges.

4. The auxiliary sun visor as set forth in claim 1, wherein:
   the hollow body includes an elongated configuration; and
   the hollow body includes a pair of posts extending from the ends and aligned with the first axis.

5. The auxiliary sun visor as set forth in claim 1, wherein the interior wall presents a groove defined therein spanning between the first and second ends, and the ball includes a ridge engaging the groove.

6. The auxiliary sun visor as set forth in claim 4, wherein the opposed clips each include a slide to which the posts of the hollow body are coupled permitting movement of the track assembly along the slides for adjustment to the first axis with respect to the second axis.

7. An auxiliary sun visor for a vehicle sun visor comprising:
   an auxiliary sun visor panel;
   a pair of opposed clips;
   a track assembly attached to the clips and including an elongated body defining a first axis;
   a mount for attaching the visor panel to the track assembly and for permitting pivotal movement about the first axis and a second axis and permitting selective adjustment of the second axis relative to the first axis; and
   wherein the mount includes a mount channel defined therethrough for receiving the body of the track assembly and permitting pivotal movement of the panel about the first axis.

8. The auxiliary sun visor as set forth in claim 7, wherein the second axis is transverse to the first axis.

9. The auxiliary sun visor as set forth in claim 7, wherein the panel presents a pair of opposed side edges and the second axis is located between the edges.

10. The auxiliary sun visor as set forth in claim 7, wherein the mount includes a ball and socket joint permitting pivotal movement of the panel about the second axis.

11. The auxiliary sun visor as set forth in claim 7, wherein the mount includes a releasable brake positioned along the mount channel for selective engagement and disengagement with the track assemble permitting selective adjustment of the second axis relative to the first axis.

12. An auxiliary sun visor for a vehicle sun visor comprising:
- an auxiliary sun visor panel;
- a pair of opposed clips;
- a track assembly attached to the clips, the assembly including a body having first and second ends and presenting a channel defined by an interior wall;
- a mount for attaching the visor panel to the track assembly and for permitting pivotal movement about a first axis and a second axis;
- wherein the track assembly body presents a generally C-shaped cross-section; and
- wherein the mount includes a first portion having a ball received in the channel of the track assembly body permitting pivotal movement of the mount about the first and second axes, and a second portion coupled with the panel.

13. The auxiliary sun visor as set forth in claim 12, wherein a threaded post extends from each of the ends of the track assembly body, the posts engaging the respective clips for attachment of the track assembly to the clips.

14. The auxiliary sun visor as set forth in claim 12, wherein the interior wall presents a groove defined therein spanning between the first and second ends, and the ball includes a ridge engaging the groove.

* * * * *